Figure 1:
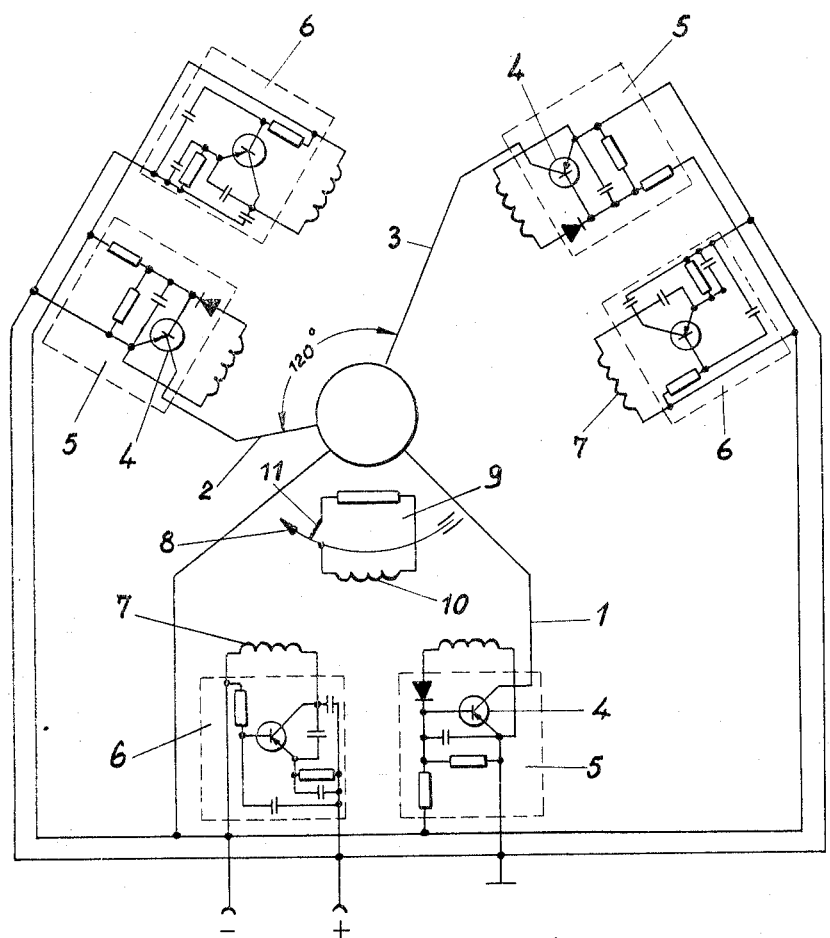

March 8, 1966        H. SCHOLL        3,239,739

APPARATUS FOR CONTROLLING ELECTRIC MOTORS

Filed May 14, 1963        2 Sheets-Sheet 1

March 8, 1966          H. SCHOLL          3,239,739
APPARATUS FOR CONTROLLING ELECTRIC MOTORS
Filed May 14, 1963          2 Sheets-Sheet 2
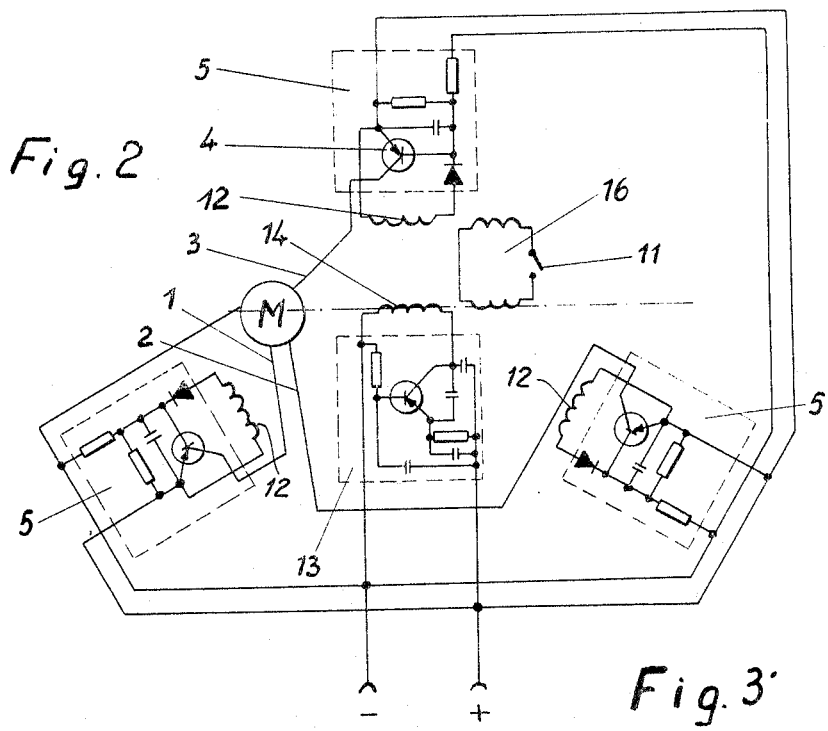
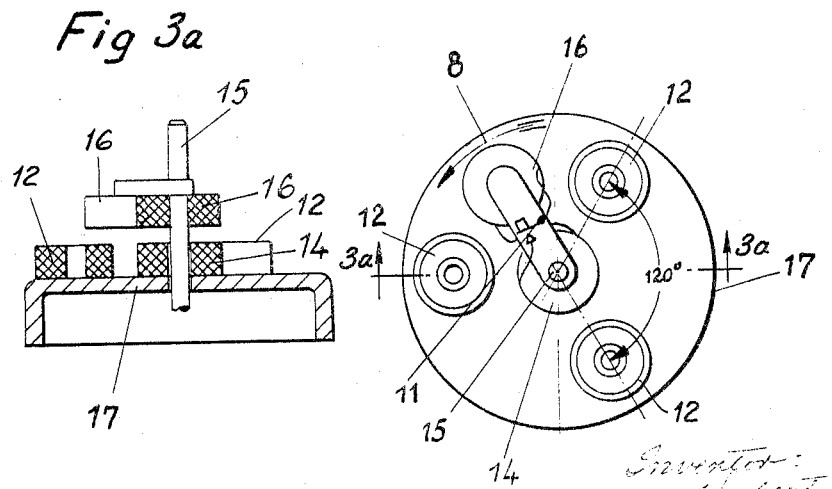

United States Patent Office 3,239,739
Patented Mar. 8, 1966

3,239,739
APPARATUS FOR CONTROLLING
ELECTRIC MOTORS
Herbert Scholl, Nurnberg, Bavaria, Germany, assignor to
Gebr. Buhler Nachfl. G.m.b.H., Nurnberg, Bavaria,
Germany, a firm
Filed May 14, 1963, Ser. No. 280,400
Claims priority, application Germany, May 19, 1962,
B 67,318
7 Claims. (Cl. 318—138)

In the conventional electric motors, the commutator mounted on the armature shaft, establishes communication between the armature winding and the outer current circuit through the intermediary of stationary brushes sliding over it. This arrangement is open to numerous objections. The passage of current is relatively poor, not least due to the wear caused by friction and sparking takes place with its objectional results, as well a considerable noise. In addition, the commutator is frequently the cause of great difficulty in starting up. Furthermore, the motors operating with a commutator are by no means capable of meeting the present day requirements as regards regulation, especially speed regulation.

Therefore the object of the invention is to improve the operation of the known electric motors to such an extent that, while dispensing with a commutator for transferring the current, the objections caused thereby are eliminated which can only be partly overcome otherwise by extremely high expense.

To attain this object the invention provides that each lead-in wire has a control element which is controllable during the rotation of the polarized armature through a certain angle by an oscillator which in turn is dependent upon the rotation of the armature, and that the $n$-control elements are arranged at an angle of $360°/n$.

Therefore, instead of the commutator, the control elements which operate in functional dependency upon the rotation of the armature are employed. In a particularly simple case, the number $n$ of the control elements is three. However, this number can be varied considerably.

In developing the general basic idea of the invention it is proposed in a practical form of construction to incorporate in each control element a self-exciting oscillator, the oscillatory circuit coils of which are located in the effective range of a damping screen rotating with the armature and which imposes a damping effect on at least one of the oscillatory circuits.

This construction enables the motor to be controlled solely by induction, so that a maximum degree of reliability and exceptional precision in operation are attained, which are essentially conditions for numerous purposes of use, especially in the technique of regulation. If, for example, the oscillatory circuit coil of the oscillator actually undergoing oscillation comes under the influence of the screen, the damping caused thereby has the effect that no more high-frequency current is produced and as a result the control element can draw full current.

The invention also covers another possibility in that, according to another feature, a common oscillator is coordinated to the $n$-control elements as an oscillation generator, the output voltage of which can always be coupled to at least one of the control elements.

As a result, a flow of current always takes place in a suitable manner in the control elements when the coupling element comes into operative connection with the control elements during the rotation of the armature. This flow of current then initiates the desired control.

It has been found advantageous to design the arrangement so that the control elements have a transistor which functions as a switch. However, according to a modification, a cleared contact may also be used instead as switch.

Which of these elements is given preference will depend upon the requirements which have to be met.

The damping screen rotating with the armature consists, according to another feature of the invention, of a simple sheet-metal vane or lug. It may, however, also consist of a damping coil which rotates with the armature. In any case the damping of the individual oscillations must be so great that the control elements coordinated thereto can respond.

The fact that the coupling is inductive also comes withing the scope of the invention. In this connection the arrangement of a coupling coil provided in a further development of the idea according to the invention, presents particular advantages. However, instead thereof, a HF iron yoke can be used for the coupling.

For certain purposes of use the object of the invention can be achieved with the aid of a capacity coupling.

In another embodiment of the invention one of the current receiving elements rotating with the armature may have a centrifugal switch which carries out a controlling function on the actual control element or elements.

Thus a switching member is incorporated in to the armature-dependent control of the control elements, which member, owing to its light contact loading, forms a particularly accurately operating speed feeler which, for example, interrupts the flow of current through the coupling coil or the damping coils which actually rotate with the armature, so that in one case the damping becomes inopertive and in the other case the coupling becomes currentless.

This feature imparts particular importance to the invention seeing that in this manner a regulation of speed is attained which is capable of meeting the most exacting requirements and which only requires a minimum expenditure because the desired result is already attained by the fact that the basic construction of the control is only supplemented by a centrifugal governor which is just as simple as it is effective. This apparatus combines the advantages of operating without commutator with those of maximum accurace of response and regulation.

Other features, details and advantages of the invention will become apparent from the following description of several embodiments of the invention with reference to the accompanying drawings, in which FIG. 1 is a diagram of a first embodiment, FIG. 2 is a diagram of a second embodiment and FIG. 3 is an end view of a motor-bearing bracket on which certain coils of FIG. 2 are mounted, and also showing the mounting of coupling coils 16 on the motor shaft, and FIG. 3a is a sectional view of FIG. 3 as seen along the line 3a—3a.

The current feed wires of the motor designated by M are shown at 1, 2 and 3 and in each of these wires a control element in the form of a switch 5 fitted with a transistor 4 is arranged. This switch 5 includes the necessary resistances as well as a condenser and a rectifier. To each of these control elements 5 and an oscillator 6 of known construction is coordinated, the control coil of which is designated by 7. The oscillator 6 generates a HF current and thus causes the switch 5 to open so that the current flows through the individual feed wires 1, 2 and 3.

According to FIG. 1, the control elements 5 are displaced through $360°/n=120°$ in relation to each other.

A screen in the form of a damping circuit 9 with a resistance and a coil 10, rotates with the armature of the motor M, not shown on the diagram but which rotates, for example, in the direction of the arrow 8. For regulating the speed, a centrifugal governor rotates with the damping coil and is provided with normally closed contacts 11 which are connected in the damping circuit 9.

If the motor M rotates in the direction of the arrow 8, the damping coil 10 rotating with the armature will act successively on the control coil 7 of the actual oscillator 6. As a result the HF current generation is interrupted by the oscillator so that the switch 5 controlled by this oscillator can draw full current. This sequence is repeated afresh at each of the three control elements of the respective oscillator during the rotation of the damping circuit, so that an effective and extremely reliably operating motor control results.

If the number of revolutions of the armature increases beyond a predetermined value, the switch 11 opens under the action of centrifugal force, so that the damping effect produced by the coil 10 is momentarily interrupted so that the oscillator 6 actually located in the effective range of the coil 10 of the damping circuit 9 moves on and consequently the actual switch 5 is opened. If the number of revolutions of the motor drops owing to the interruption of current feed thereto, the centrifugal switch 11 again closes on the number of revolutions reaching a certain limit, so that the damping circuit 9 is again rendered operative.

FIG. 2 shows a circuit arrangement with $n=3$ control elements in the form of switches designated by 5, which are likewise equipped with transistors 4 and each has a coupling coil 12. In this case simple HF or ferrite coils come into question. A common oscillator designated as a whole by 13 is coordinated to the three control elements 5 in this embodiment of the invention, the control 14 of this oscillator 13 being arranged around the armature shaft 15 as shown particularly in FIG. 3. Connected with this armature shaft 15 is a coupling coil 16 which rotates outside the HF coils 14 mounted on the bearing bracket 17 of the motor and thereby comes successively within the effective range of each of the coupling coils 12 of the control elements 5. A flow of current thereby forms in one of the coupling coils 12 which, however, is again immediately interrupted, whereupon however the next following coupling coil is under current. Also in this case the three coupling coils 12 illustrated by way of example are displaced through an angle of 120° in relation to each other. Consequently the sequence of operations is repeated at regular intervals as the coupling coil 16 rotates in the direction of the arrow 8.

As in the case of the embodiment illustrated in FIG. 1, this rotating coupling coil 16 can also have a centrifugal switch 11 which opens when the number of revolutions of the armature shaft 15 exceeds a certain value and closes when this number drops.

It is evident that the invention is not restricted to the embodiments above described and illustrated in the drawing, but that it is possible to introduce numerous modifications without departing from the fundamental idea of the invention.

What I claim is:

1. In apparatus for controlling a direct current electric motor provided with a polarized armature and in which operating current for the motor is supplied over three conductors angularly spaced by 120°, and including a switch in each supply conductor, the combination of at least one self-exciting oscillator, means controlled by said oscillator for normally maintaining said switches in cut-off condition, said self-exciting oscillator being subject to damping of its oscillatory circuit to prevent oscillation thereof, and damping means rotating with said armature and operating upon said oscillator to effect successive operation of said switching means to supply operating current to said motor over said conductors in succession.

2. Apparatus according to claim 1 in which each switch is controlled by a separate self-excited, dampable, oscillator.

3. Apparatus according to claim 1 in which a single oscillator supplies alternating current to all three switches to maintain said switches in a normally cut-off condition.

4. Apparatus according to claim 1 in which said switches each comprise a transistor.

5. Apparatus according to claim 1 wherein said damping means comprises a coil connected in a damping circuit and mounted to rotate with said armature into inductive relation with the oscillator circuit.

6. Apparatus according to claim 1 in which said damping means includes a coil mounted to rotate with the armature and connected in a closed circuit, a centrifugal switch mounted to rotate with said armature and including normally closed contacts connected in the closed circuit of said coil.

7. Apparatus according to claim 1 in which each switch is provided with a control coil, and the three control coils are arranged at equal angular spacings about the armature shaft, and said damping means includes a current conducting element mounted to rotate with the armature and positioned to move into inductive relation with said control coils in succession.

References Cited by the Examiner
UNITED STATES PATENTS

| | | | |
|---|---|---|---|
| 2,980,839 | 4/1961 | Haeussermann | 318—138 |
| 3,050,671 | 8/1962 | Moller | 318—138 |
| 3,091,728 | 5/1963 | Hogan et al. | 318—138 |

ORIS L. RADER, *Primary Examiner.*